Nov. 5, 1935.　　J. C. WOODFORD　　2,020,272
LIQUID DISPENSING APPARATUS
Filed April 3, 1935　　3 Sheets-Sheet 3
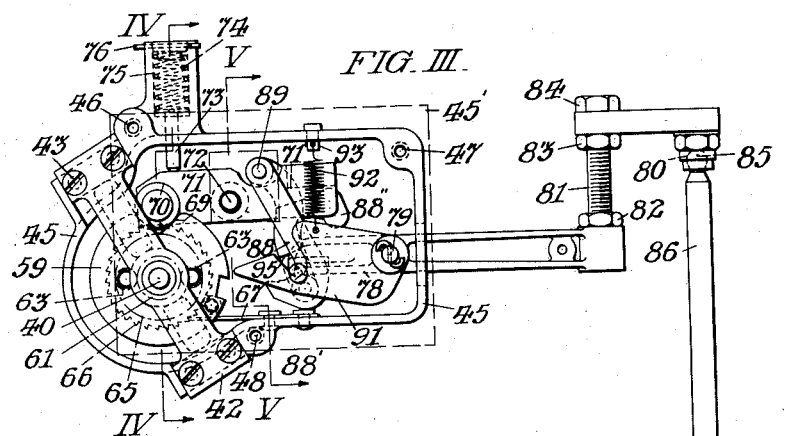
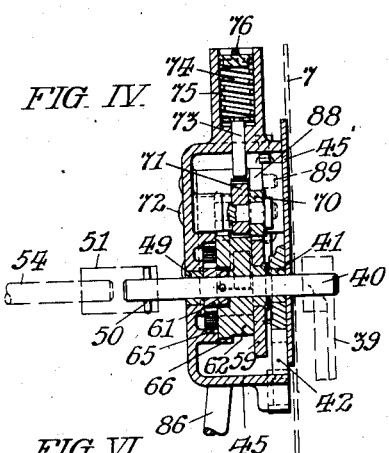
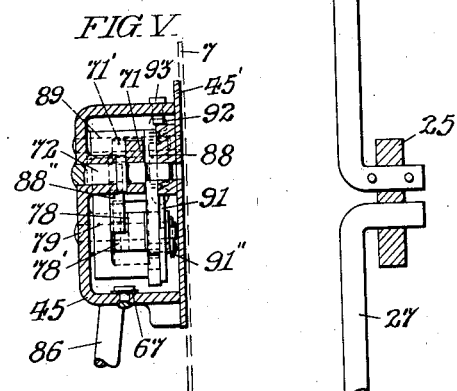
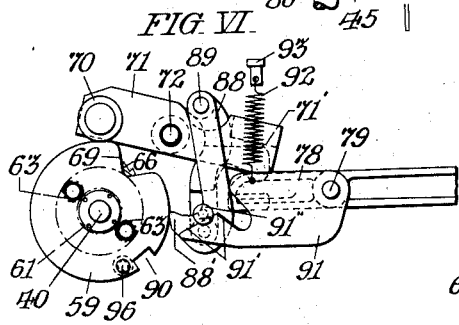
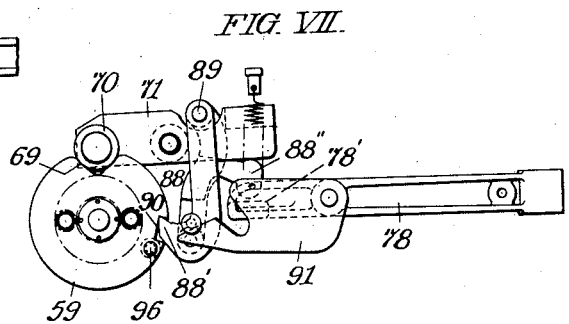
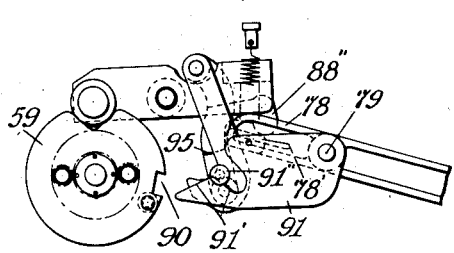
INVENTOR:
JOSEPH C. WOODFORD,
BY
Attorney.

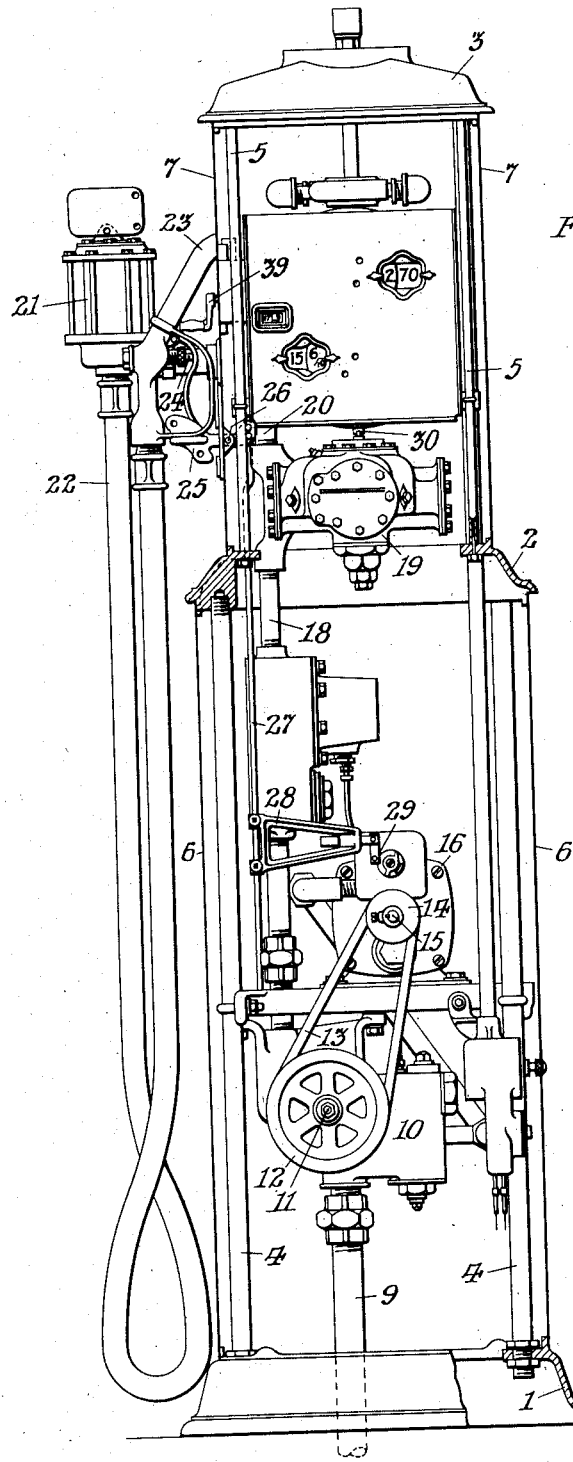

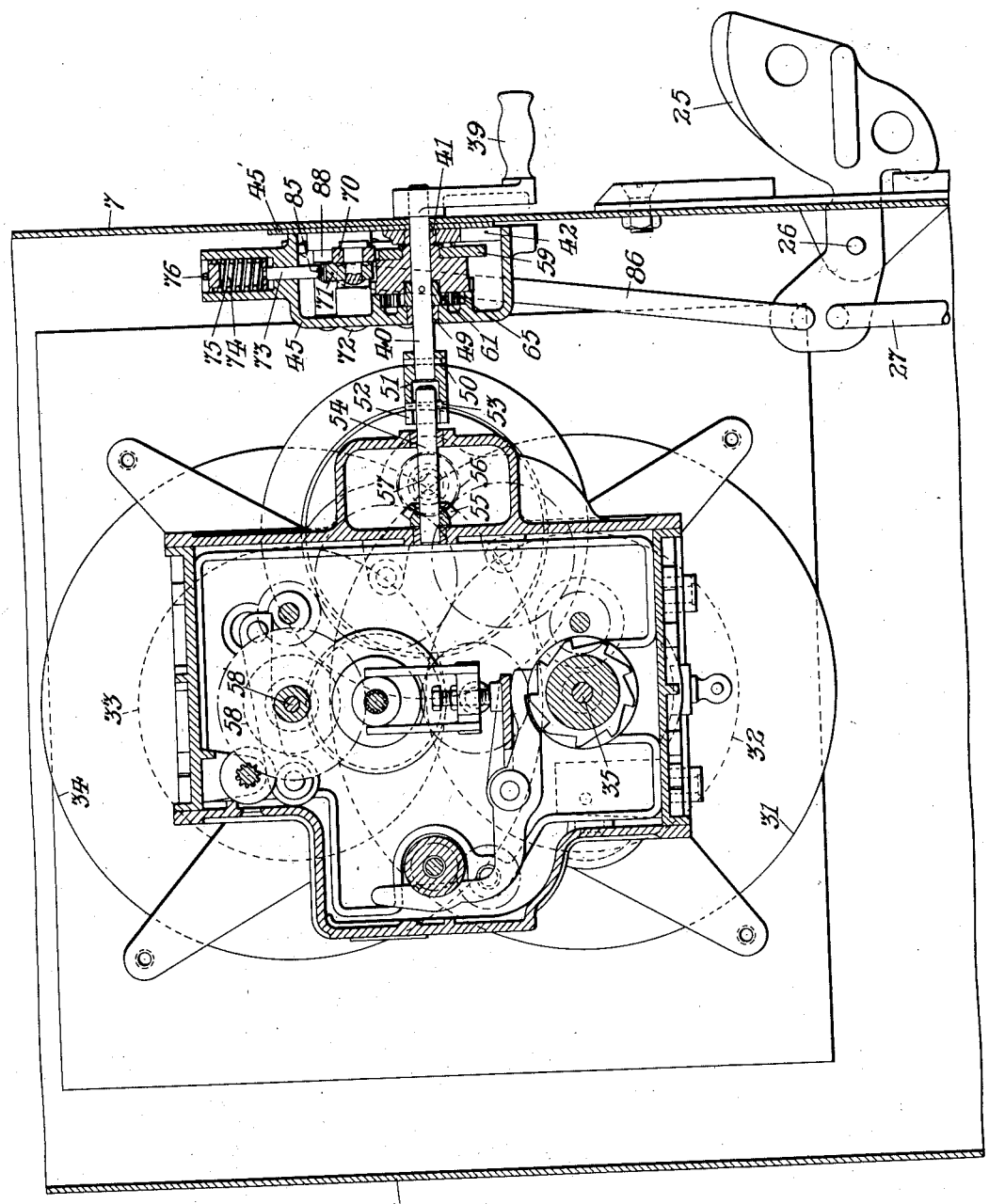
FIG. II.

Patented Nov. 5, 1935

2,020,272

UNITED STATES PATENT OFFICE 2,020,272

LIQUID DISPENSING APPARATUS

Joseph C. Woodford, Haverford, Pa., assignor to John Wood Manufacturing Company, Inc., Conshohocken, Pa., a corporation of Delaware Application April 3, 1935, Serial No. 14,396

9 Claims. (Cl. 221—95)

This invention is particularly applicable to apparatus of the kind disclosed in my copending applications for Letters Patent of the United States respectively Serial No. 750,805 filed October 31, 1934, and Serial No. 754,201 filed November 22, 1934, to wit, apparatus of what is known as the metering pump type, including a meter through which gasoline or other liquid is forced by a pump to and through a flexible dispensing hose having at the end thereof a nozzle provided with a valve for control by the dispensing operator; said pump being operable by an electric motor. Said meter is operatively connected with registering mechanism indicating the volume of liquid dispensed, for instance, in gallons and fractions of a gallon.

Such apparatus includes what is known as a "set-back" mechanism by which the operator may restore the indicating mechanism to zero position between successive dispensing operations but is not, ordinarily, provided with any means for insuring that the operator shall return the indicating mechanism to zero position after one dispensing operation before beginning the next. Consequently, a careless or felonious operator may cheat the customer by failing to return the indicating mechanism all the way to zero position between successive dispensing operations. For instance, the indicating mechanism may be returned to a one gallon mark instead of to the zero mark and with the effect that the next customer gets one less gallon than appears by the indicating mechanism to have been dispensed at that transaction.

Such fraudulent manipulation of the apparatus is in fact facilitated by the usual construction thereof including an electric switch for starting and stopping said electric motor which is operable by manipulation of the hose to and from its normal idle position of rest upon its support projecting from the casing of the apparatus. Therefore, the purpose and effect of my invention claimed in application Serial No. 754,201 aforesaid is to deprive the operator of any opportunity to fraudulently manipulate the mechanism indicating the volume dispensed by means which, upon initial movement of the setback mechanism, renders said electric motor inoperative unless and until the indicating mechanism is in fact restored to its initial zero position. In other words, whereas in ordinary liquid dispensing apparatus the indicating mechanism may be manipulated by the operator independently of the dispensing apparatus, my invention provides means for establishing an interlocking relation between the liquid dispensing apparatus and the means indicating the volume of liquid dispensed efficient to prevent such fraudulent manipulation of the indicating mechanism.

In said application Serial No. 754,201, I illustrated a form of the invention wherein the setback mechanism includes a shaft provided with a crank handle to be manually operated but one revolution and the interlocking mechanism is directly connected with that shaft to be directly turned therewith. However, I find that, in some forms of dispensing apparatus, to effect the resetting to zero by a single revolution of the crank shaft imposes an undesirable amount of labor upon the operator. Therefore, my present invention provides means for indirectly connecting such set-back crank shaft with the interlocking mechanism so that the latter may be turned but one revolution as a consequence of several revolutions of the set-back shaft, thus permitting an easier operation of the set-back mechanism. In the form of my invention chosen for illustration herein, the means cooperatively connecting the set-back shaft with the interlocking mechanism aforesaid includes a train of planetary gearing.

My invention includes the various novel features of construction and arrangement hereinafter more definitely specified. The computing registering mechanism incidentally shown is the subject matter of my copending application aforesaid Serial No. 750,805 filed October 31, 1934, and some broad combinations of elements of the interlocking mechanism herein incidentally shown are claimed in my copending application Serial No. 754,201 aforesaid.

In said drawings, Fig. I is an elevation of a liquid dispensing apparatus, of the curbstand type, conveniently embodying my invention.

Fig. II is a fragmentary vertical sectional view of said dispensing apparatus, taken on a plane parallel with the front of Fig. I on the axis of rotation of the crank handle of the set-back mechanism.

Fig. III is an elevation, partly in section, showing said switch locking mechanism as seen from the left hand side of Fig. I, in the position it occupies at the close of a dispensing operation, before the indicating mechanism is set back to zero.

Fig. IV is a vertical sectional view, taken on the line IV, IV in Fig. III, in the direction of the arrows on said line.

Fig. V is a vertical sectional view, taken on the line V, V in Fig. III, in the direction of the arrows on said line.

Fig. VI is a fragmentary elevation of the switch locking mechanism in the position it assumes upon initial movement of the set-back mechanism.

Fig. VII is a fragmentary elevation of said switch locking mechanism in the position it assumes when the set-back mechanism has restored the indicating mechanism to zero position.

Fig. VIII is a fragmentary elevation of said locking mechanism in the position which it assumes when the hose is removed from the hook and the electric switch permitted to close to start the next dispensing operation.

Referring to Fig. I; the liquid dispensing apparatus is principally contained in the housing which is adapted to be rigidly mounted upon a pavement or a platform at a curb or driveway and includes three transversely extending cast metal frame members, viz., the base member 1, the intermediate member 2, and the top member 3. Said frame members 1, 2, and 3 are rigidly connected in the vertical relation shown by a columnar frame including standards 4 connecting the frame member 1 with the frame member 2 and the standards 5 connecting the frame member 2 with the frame member 3. Said housing includes the two casing sections 6 and 7 which are rectangular tubes with rounded corners; said section 6 extending between said frame members 1 and 2 and said section 7 extending between said frame members 2 and 3.

The liquid to be dispensed is conveniently stored in an underground tank from which it is elevated through the pipe 9 by the operation of the pump 10. Said pump includes a rotor having the shaft 11 with the grooved pulley 12 connected by the belt 13 with the grooved pulley 14 on the armature shaft 15 of the electric motor 16. The liquid is discharged from said pump 10 through the conduit 18 into the flow meter 19 from which it is discharged through the conduit 20 and sight gage 21 into the flexible dispensing hose 22 which is provided at its free end with the nozzle 23 including the valve 24 which is normally closed but may be opened by the dispensing operator. The hook lever 25, which is fulcrumed at 26 on said casing section 7, is provided to support the hose nozzle in idle position, the outer end of said lever being then depressed by the weight of the hose and nozzle. The inner end of said lever 25 is pivotally connected with the vertically reciprocatory rod 27 which carries the bracket 28 for operating the electric switch 29. The arrangement is such that when the outer end of said lever 25 is lowered, as shown, said switch 29 is opened to deenergize the motor 16 and stop the operation of said pump 10, but, when said lever 25 is raised, said switch is closed to operate said pump.

Said flow meter 19 includes a rotor which is turned by the passage of liquid therethrough from the conduit 18 to the conduit 20, and has the shaft 30 which makes one revolution for each gallon of liquid passed through said meter 19. That shaft is operatively connected with registering mechanism including the rotary dials 31 and 32 respectively indicating the number of gallons and fractions of a gallon dispensed, and dials 33 and 34 respectively indicating the value of the volume dispensed in dollars and cents. Said dial 32 is mounted on the shaft 35 so as to make one revolution for each gallon dispensed, but said dial 31 is only moved the angular distance from one graduation to the next on that dial at each revolution of the dial 32; so that the number of gallons and fractions of gallons dispensed are thus registered. Such computing and registering mechanism is the subject matter of my copending application for Letters Patent of the United States Serial No. 750,805 filed October 31, 1934, and is not herein claimed.

Said indicating mechanism is arranged to be set back to zero by clockwise manual rotation of the crank 39 which is operatively connected with the set-back shaft 40 extending through the side of said casing section 7. Said shaft 40 is journaled at its outer end in the bearing 41 in the cross bar 42 which is detachably rigidly connected, conveniently by the screws 43, with the lock casing 45. Said lock casing has the separable cover 45' and is conveniently rigidly connected with the casing 7 by three screws 46, 47, and 48 extending through holes in said cover into lugs on said casing 45. The inner end of said set-back shaft 40 is journaled in the bearing 49 in said casing 45 and provided with the cross pin 50 engaging the slightly loose coupling 51 which has the slot 52 engaging the cross pin 53 on the indicator shaft 54 which carries the bevel gear 55 which is suitably connected with said shaft 35 of said dial 32, by means, shown in Fig. II, including the bevel gear 56 in mesh with said bevel gear 55 and carried by the shaft 57; and the friction clutch 58 on the shaft 58', which permits the dials to be set back to zero position, by manual rotation of said crank 39, while the other mechanism is held stationary by its connection with the meter.

The cam 59 is in coaxial relation with said shaft 40 but in relative rotary relation therewith and connected therewith by a planetary gear train so that said crank 39 must be turned three revolutions to effect one revolution of said cam. That gear train includes the sun gear 61 which is fixed on said shaft 40; the planetary gear carrier 62 which is in coaxial relation with said shaft 40 but loose therefrom; and the two planetary gears 63 which are journaled on said carrier, in mesh with said sun gear 61 and with the internal gear 65 which is fixed in said casing 45 and, as indicated in Fig. IV, is conveniently die cast in unitary relation therewith. Said carrier is provided with the circular ratchet 66 for engagement with the spring 67 which is fixed at one end in said casing 45, as shown in Fig. III, so that said shaft 40 and cam 59 may only be turned clockwise, which is the direction for setting back the indicating mechanism aforesaid.

Said cam 59 has the notch 69 in its periphery to normally receive the roller 70 in the position shown in Fig. VII which corresponds with the zero position of said indicating dials. Said roller is carried by the locking lever 71 which is fulcrumed on the stationary stud 72 in said lock casing 45 and continually stressed downward at its end provided with said roller 70 by the plunger 73 under stress of the spring 74 which is mounted in the socket 75 in said casing 45 in which it is retained by the cross pin 76. The opposite end of said locking lever 71 projects over the inner end of the switch control lever 78 which is fulcrumed on the stationary stud 79 in said casing 45 and has its outer end provided with the ball socket 80 connected with said lever by the screw 81 and nuts 82, 83 and 84 by which said socket 80 may be adjusted in its relation to said lever in the assembly of the mechanism in cooperative relation. Said socket engages the ball end 85 on the link 86 which connects said switch control lever 78 with said hose supporting lever 25.

As above noted, the inner end of said hose lever 25, connected with the switch rod 27, must be depressed to close said switch 29 by which the pump motor 16 is energized. Such movement of said lever 25 is only permitted when the inner end of said lever 78 is free to rise from the position shown in Figs. III, VI, and VII to the position shown in Fig. VIII. Therefore, when the initial movement of the set-back shaft 40 lifts the roller 70 from the notch 69 in said cam 59, the right hand end of the lever 71 is pressed down and held down by said cam 59, in contact with the top surface of said lever 78, as shown in Fig. VI, so that the inner end of said lever 78 cannot be raised and, consequently, the switch cannot be closed to energize said pump motor. If the switch is closed at the beginning of the set-back operation, said lever 78 is upturned at its inner end to the position shown in Fig. VIII and, if so, the initial movement of said lever 71 by its roller 70, as above described, thrusts the inner end of said lever 78 downwardly to the position shown in Fig. VI and opens said switch, stopping the motor. Because said switch 29 is thus opened, the operation of the motor 16 cannot be resumed until said cam 59 has been manually turned a complete revolution by three revolutions of said crank 39 and set-back shaft 40 to again permit the roller 70 to drop into the notch 69 under stress of said spring 74, as shown in Fig. VII, which corresponds with the zero position of the indicating mechanism including the dials 31 and 32, shown in Fig. II.

I also find it convenient to employ in association with said locking lever 71 and switch control lever 78 the hook detent lever 88 which, as shown in Fig. III, is fulcrumed in said casing 45 on the stud 89 and has its hook point 88' adapted to engage in the detent recess 90 in the periphery of said cam 59 to positively stop the rotary movement of said cam at the termination of the setback operation when said cam has reached the position shown in Fig. VII which, as aforesaid, corresponds with the zero position of the indicating dials. In that position of said hook lever 88, its arm 88" overhangs the flange 78' on the switch control lever 78, as shown in Fig. VII, so that manual movement of said lever 78 from the position shown in Fig. VII to the position shown in Fig. VIII to close said switch 29 effects the withdrawal of said hook lever point 88' from said recess 90, as shown in Fig. VIII. Said hook lever 88 is withheld from engagement with said cam 59 by means of the cam lever 91 which, as shown in Fig. III, is also fulcrumed on said stud 79 in the casing 45 and provided with the snap spring 92 which is engaged at its lower end in said cam lever 91 and at its upper end in the stud 93 in said casing 45. Said spring 92 is effective to shift said hook lever point 88' both away from and toward its position of engagement with said notch 90 in the cam 59, by means of the double inclined cam 91' on said cam lever 91, bearing against the stud 91'".

Said apparatus is operated as follows: When any dispensing operation is completed, or at any time when the pump is stopped, by placing the hose 22 in inoperative position upon its supporting lever 25 as in Fig. I, or by otherwise depressing that lever, to open the switch 29; the switch control lever 78 is thereby tilted to the position shown in Fig. III so that no additional amount of liquid may be dispensed until after the indicator is set back to zero position; because said switch control lever 78 is thus locked, with said switch open.

Until set back, the indicating mechanism retains its manifestation of the volume of liquid delivered, during the latest dispensation, the price charged for the same per gallon, and the value of the liquid delivered, for instance, 15 6/10 gallons at 17.3 per gallon, totaling $2.70. When the operator desires to set the apparatus for another dispensing operation; he turns the crank 39 clockwise to actuate the mechanism for setting back the indicating mechanism to zero position. The initial movement of said crank turns the cam 59 clockwise to the position shown in Fig. VI in which the roller 70 is forced out of the notch 69 to press the right hand end of its lever 71 down upon the top of the switch control lever 78 to further prevent the movement of said lever 78 which is necessary to permit the switch 29 to be closed. Said roller lever 71 has at the right hand end thereof the flange 71' which normally clears the top of the hook lever arm 88", as shown in Fig. III, but when said lever is moved to the tilted position shown in Fig. VI, by rotation of said cam 59, said flange 71' thrusts said arm 88" downward and swings the hook lever to the left in Fig. III so that it rides over the crest of said cam 91' on the cam lever 91, whereupon, said spring 92 stressing the cam lever upwardly thrusts against the stud 91" so that the point 88' of said hook lever 88 bears against the periphery of said cam 59, as shown in Fig. VI. The operator continues to turn the set-back crank 39 until it completes three revolutions. Immediately before the completion of the third revolution, the point 88' of the hook lever drops into the recess 90 so that, upon completion of the third revolution of the crank 39 which brings the notch 69 again in registry with the roller 70 to permit the latter to fall into said notch, as in Fig. VII, the set-back and indicating mechanisms are positively stopped by said hook lever point 88' in engagement with the wall of said recess 90 as in Fig. VII with the indicating mechanism precisely in zero position. If it were not for such cooperation of the hook detent lever 88 with the cam 59, it would be possible, so far as the switch lock mechanism is concerned, for the operator to turn the set-back mechanism and indicating mechanism back of the zero position of the latter to thus falsely manifest that a volume of liquid has been dispensed. In the position shown in Fig. VII, the indicating mechanism being in zero position, a succeeding dispensing operation may be initiated by uplifting the hose supporting lever 25 with the effect of closing the switch 29 to energize the pump motor 16. Such movement of the hose lever 25 effects movement of the switch control lever 78 to the tilted position shown in Fig. VIII and, in passing to that position, the flange 78' on said lever 78 thrusts upwardly against the underside of the arm 88" on the hook lever 88 to withdraw the hook lever point 88' from the recess 90 in the cam 59. That movement carries said stud 91'" to the position shown in Fig. VIII, to the right of the crest of the cam 91' on the cam lever 91, where it is stopped by contact of the left hand end of the flange 78' on said switch lever 78 with the right hand side of the hook lever, as indicated by dotted lines in Fig. VIII. However, when said switch control lever 78 is moved from the position shown in Fig. VIII toward the position shown in Fig. III, by depressing the outer end of the hose supporting lever 25 by the weight of the hose or otherwise, said switch lever flange 78' is released from engagement with the hook lever 88 and the snap spring 92 permitted to snap the cam lever 91 upward to the position shown in Fig. III, thus thrusting the hook lever 88 by its stud 91'' to its extreme right hand position shown in Fig. III. In that position, the shoulder 95 on said hook lever 88 overhangs the flange 78' on said switch control lever 78 and prevents it from being tilted to position to close the switch by movement to the position shown in Fig. VIII.

With the construction and arrangement shown, said roller 70 would drop into said recess 90 and thus permit undesired movement of said locking lever 71 and switch control lever 78, unless means be provided for preventing the same. Therefore, I find it convenient to provide said cam 59 with the stud 96, in advance of said recess 90 during the clockwise rotation of said cam, so that said stud is presented beneath the locking lever 71 to uphold it while the recess passes beneath said roller 70 without permitting the latter to be lowered within the circumference of said cam 59. However, it is obvious that said cam 59 and the parts associated therewith may be otherwise constructed and arranged to effect the operation as above described.

Therefore, I do not desire to limit myself to the precise details of construction and arrangement herein set forth, as it is obvious that various modifications may be made therein without departing from the essential features of my invention, as defined in the appended claims.

I claim:

1. In liquid dispensing apparatus, the combination with a meter for measuring the volume of liquid dispensed; of a pump for dispensing liquid through said meter; an electric motor operatively connected with said pump; an electric switch for controlling the operation of said motor and pump; a locking lever carrying a roller for controlling the operation of said switch; a casing for said locking lever; an internal gear fixed in said casing; a rotary shaft journaled in said casing in coaxial relation with said internal gear; means whereby said switch is held open, with the pump idle, after each dispensing operation, until the indicating mechanism is set back to zero position by a plurality of rotations of said shaft, including a cam in coaxial relation with said shaft but in relative rotary relation therewith and in cooperative relation with said roller; planetary gearing connecting said shaft with said cam, including a sun gear fixed on said shaft, a planetary gear carrier in coaxial relation with said shaft, and a planetary gear journaled on said carrier and in mesh with said internal gear and said sun gear.

2. In liquid dispensing apparatus, the combination with a meter for measuring the volume of liquid dispensed; of a pump for dispensing liquid through said meter; an electric motor operatively connected with said pump; an electric switch for controlling the operation of said motor and pump; a locking lever carrying a roller for controlling the operation of said switch; a casing for said locking lever; an internal gear fixed in said casing; a rotary shaft journaled in said casing in coaxial relation with said internal gear; a cam in coaxial relation with said shaft, but in relative rotary relation therewith and in cooperative relation with said roller; planetary gearing connecting said shaft with said cam, including a sun gear fixed on said shaft, a planetary gear carrier in coaxial relation with said shaft, and a planetary gear journaled on said carrier and in mesh with said internal gear and said sun gear; a ratchet on said carrier, in coaxial relation with said sun gear; and a pawl supported at one end by said casing and having its free end engaging said ratchet for limiting rotation of said ratchet and shaft to one direction.

3. In liquid dispensing apparatus, the combination with a meter for measuring the volume of liquid dispensed; of a pump for dispensing liquid through said meter; means for indicating the volume of liquid thus dispensed at each dispensing operation; an electric motor operatively connected with said pump; an electric switch for controlling the operation of said motor and pump; a locking lever for controlling the operation of said switch; set-back mechanism for restoring said indicating mechanism to zero position; means including a cam operatively connecting said set-back mechanism with said locking lever; means operatively connected with said cam for positively stopping said set-back mechanism when said indicating mechanism is restored to zero position; and means operatively connecting said set-back mechanism with said switch; whereby said switch is held open, with the pump idle, after each dispensing operation until the indicating mechanism is set back to zero position.

4. Apparatus as in claim 3, wherein the cam has a detent recess and the means for positively stopping said set-back mechanism includes a detent member movable into and out of said recess.

5. Apparatus as in claim 3, wherein the cam has a detent recess and the means for positively stopping said set-back mechanism includes a detent hook lever movable into and out of said recess, and means for shifting said detent into engagement with said recess, including a lever and a spring stressing said lever.

6. Apparatus as in claim 3, wherein the cam has a detent recess and the means for positively stopping said set-back mechanism includes a detent hook lever movable into and out of said recess, and means for shifting said detent into engagement wtih said recess, including a cam lever and a spring stressing said lever.

7. Apparatus as in claim 3, wherein the cam has a detent recess and the means for positively stopping said set-back mechanism includes a detent hook lever movable into and out of said recess, and means for shifting said detent into engagement with said recess, including a cam lever and a spring stressing said lever; said cam lever and spring being constructed and arranged to alternately snap said hook lever toward and away from said recess.

8. Apparatus as in claim 3, wherein the cam has a detent recess and the means for positively stopping said set-back mechanism includes a detent hook lever movable into and out of said recess, and means for shifting said detent into engagement with said recess, including a lever and a spring stressing said lever, said locking lever being movable to release said detent from said recess and permit its operation by said spring, preliminary to each dispensing operation.

9. In liquid dispensing apparatus, the combination with a meter for measuring the volume of liquid dispensed; of a pump for dispensing liquid through said meter; means for indicating the volume of liquid thus dispensed at each dispensing operation; an electric motor operatively connected with said pump; an electric switch for controlling the operation of said motor and pump; a locking lever carrying a roller for controlling the operation of said switch; set-back mechanism for restoring said indicating mechanism to zero position; means including a cam operatively connecting said set-back mechanism with said locking lever, said cam having a detent recess; means operatively connected with said cam for positively stopping said set-back mechanism when said indicating mechanism is restored to zero position, including a detent for engagement wtih said recess; and means carried by said cam, for preventing said roller from entering said recess; whereby said switch is held open, wtih the pump idle, after each dispensing operation until the indicating mechanism is set-back to zero position.

JOSEPH C. WOODFORD.